United States Patent
Bowler et al.

(10) Patent No.: US 10,341,038 B2
(45) Date of Patent: Jul. 2, 2019

(54) MULTIPLEX CONVERSION FOR A PASSIVE OPTICAL NETWORK

(75) Inventors: David B. Bowler, Acton, MA (US); Xinfa Ma, Acton, MA (US)

(73) Assignee: ARRIS Enterprises LLC, Suwanee, GA (US)

(*) Notice: Subject to any disclaimer, the term of this patent is extended or adjusted under 35 U.S.C. 154(b) by 153 days.

(21) Appl. No.: 13/314,136

(22) Filed: Dec. 7, 2011

(65) Prior Publication Data

US 2012/0148245 A1     Jun. 14, 2012

Related U.S. Application Data

(60) Provisional application No. 61/422,658, filed on Dec. 14, 2010.

(51) Int. Cl.
    *H04J 14/02*     (2006.01)
(52) U.S. Cl.
    CPC .................................. *H04J 14/02* (2013.01)
(58) Field of Classification Search
    CPC ..... H04J 14/0232; H04J 14/0234–0236; H04J 14/0239
    See application file for complete search history.

(56) References Cited

U.S. PATENT DOCUMENTS

| | | | |
|---|---|---|---|
| 5,745,838 A | 4/1998 | Tresness et al. | |
| 5,999,796 A | 12/1999 | Tresness et al. | |
| 6,418,558 B1 | 7/2002 | Roberts et al. | |
| 6,420,928 B1 * | 7/2002 | Bowler et al. | ............ 330/69 |
| 6,738,401 B2 | 5/2004 | Bowler et al. | |
| 6,775,840 B1 | 8/2004 | Naegel et al. | |
| 6,963,696 B1 | 11/2005 | Bowler et al. | |
| 7,031,357 B2 | 4/2006 | Bowler et al. | |
| 7,116,954 B2 | 10/2006 | Toncich | |
| 7,295,518 B1 | 11/2007 | Monk et al. | |
| 7,788,050 B2 | 8/2010 | Williams | |
| 7,825,743 B2 | 11/2010 | Tsuzuki et al. | |

(Continued)

FOREIGN PATENT DOCUMENTS

| | | |
|---|---|---|
| EP | 1267587 A2 | 12/2002 |
| WO | 2007/046876 A1 | 4/2007 |

OTHER PUBLICATIONS

E. Trojer, et al., "Current and next-generation PONs: A technical overview of present and future PON technology", Ericsson Review, No. 2, pp. 64-69, 2008.

(Continued)

*Primary Examiner* — Nathan M Cors
(74) *Attorney, Agent, or Firm* — Lori Anne D. Swanson

(57) ABSTRACT

A passive optical network system having a node that is optically coupled to optical line terminals (OLTs), and that is optically coupled to optical network units (ONUs). The node includes at least one fiber link module (FLM), each FLM including an upstream multiplex conversion device (MCD), and a downstream MCD. The upstream MCD receives an upstream optical signal from the ONUs, converts the upstream optical signal to an upstream electrical signal, and transmits a regenerated upstream optical signal to the OLTs. The downstream MCD receives a downstream optical signal from the OLTs, converts the downstream optical signal to a downstream electrical signal, and transmits a regenerated downstream optical signal to the ONUs.

21 Claims, 10 Drawing Sheets

(56) References Cited

U.S. PATENT DOCUMENTS

| | | | |
|---|---|---|---|
| 7,825,745 B1 | 11/2010 | Gavin et al. | |
| 7,930,725 B2 | 4/2011 | Johnson et al. | |
| 2002/0027688 A1* | 3/2002 | Stephenson | 359/152 |
| 2003/0072339 A1 | 4/2003 | Bowler et al. | |
| 2004/0048574 A1 | 3/2004 | Walker et al. | |
| 2004/0095976 A1 | 5/2004 | Bowler et al. | |
| 2007/0019956 A1 | 1/2007 | Sorin et al. | |
| 2008/0181613 A1 | 7/2008 | Bouda | |
| 2009/0103922 A1 | 4/2009 | Lee et al. | |
| 2009/0110398 A1* | 4/2009 | Pfeiffer | 398/63 |
| 2009/0133095 A1 | 5/2009 | Philips et al. | |
| 2009/0274471 A1 | 11/2009 | Bowler et al. | |
| 2009/0310961 A1 | 12/2009 | Bowler et al. | |
| 2009/0315626 A1 | 12/2009 | Bowler et al. | |
| 2010/0098412 A1* | 4/2010 | Boyd et al. | 398/25 |
| 2010/0111532 A1* | 5/2010 | Chen et al. | 398/67 |
| 2010/0251320 A1 | 9/2010 | Shafer et al. | |
| 2013/0125182 A1 | 5/2013 | Bowler et al. | |

OTHER PUBLICATIONS

PCT Search Report & Written Opinion, RE: Application #PCT/US2011/064039; dated Mar. 6, 2012.

ITU-T, "Recommendation ITU-T G.984.6", "Gigabit-capable passive optical networks (GPON): Reach extension", Rec. ITU-T G.984.6 (Mar. 2008).

ITU-T, "Recommendation ITU-T G.984.6 Amendment 1", "Gigabit-capable passive optical networks (GPON): Reach extension—Amendment 1: Wavelength-converting, continuous mode, and 1:N-protected range extenders", Rec. ITU-T G.984.6 (2008)/Amd.1 (Nov. 2009).

Alphion Corporation, "Product Brief: Pon.ext™—PON Reach Extension System", 2010.

R.P. Davey, et al., "Long-Reach Passive Optical Networks", Journal of Lightwave Technology, vol. 27, No. 3, pp. 273-291, Feb. 2009.

J. Thoguluva, et al., "Frame-level OEO-Regenerating GPON Reach Extender", Optical Society of America, Optical Fiber Communication Conference and Exposition, National Fiber Optic Engineers Conference (OSA/OFC/NFOEC), 2011.

Broadcom Corporation, "TK3401—Multirate 1 or 2 Gbps EPON Intelligent PON Node (IPN) Controller", available at www.broadcom.com/products/Switching/EPON-Solutions/TK3401, retrieved Dec. 6, 2011.

PCT Search Report & Written Opinion, RE: Application #PCT/US2012/063553, dated Feb. 15, 2013.

Office Action RE: Mexican Application No. MX/a/2013/006807 (foreign text and English translation); dated Aug. 2, 2014.

Office Action Re: Mexican Application No. MX/a/2013/006807; dated Feb. 6, 2015.

Official Action, RE: Korean Appliation No. 10-2013-701830, dated Jul. 8, 2015.

Official Action, Re: Canadian Application No. 2,819,857, dated Nov. 7, 2016.

Official Action, RE: Korean Application No. 10-2013-7018303 (foreign text and English translation), dated Nov. 4, 2015.

Official Action, RE: Canadian Application No. 2,819,857, dated Nov. 24, 2015.

Official Action, Re: Canadian Application No. 2,819,857, dated Aug. 17, 2017.

Examination Report, RE: European Application No. 11810926.3,. dated Apr. 24, 2017.

Official Action, Re: Korean Patent Application No. 10-2013-7018303, dated Apr. 10, 2017.

EPO Examination Report, Re: Application No. 11810926.3, dated Jun. 21, 2016.

Official Action, RE: Canadian Application No. 2,819,857, dated Aug. 1, 2018.

European Examination Report, RE: Application No. 11810926.3, dated Mar. 16, 2018.

* cited by examiner

MULTIPLEX CONVERSION FOR A PASSIVE OPTICAL NETWORK

BACKGROUND

Many communications networks provide high bit-rate transport over a shared medium, such as a Passive Optical Network (PON), a cable television coaxial or hybrid fiber/coax (HFC) network, or a wireless network. These shared medium networks typically use time, frequency, or code division multiplexing to transport data signals from a central terminal to several remote customer terminals and Time Division Multiple Access (TDMA) to transport data signals from the remote terminals to the central terminal TDMA is characterized by non-continuous or burst mode data transmission. In existing optical networks, especially in a PON architecture, each packet of information from a remote terminal is multiplexed in a time sequence on one fiber and transmitted in a burst-like manner.

A PON generally uses wavelength division multiplexing (WDM), for example, using one wavelength for downstream traffic and another for upstream traffic on a particular single fiber. WDM can include, for example, Wide Wavelength Division Multiplexing, Coarse Wavelength Division Multiplexing (CWDM), and Dense Wavelength Division Multiplexing (DWDM).

An Ethernet passive optical network (EPON) is a PON that uses standard IEEE 802.3 Ethernet frames, for example, to encapsulate Internet Protocol (IP) traffic. Conventional EPON varieties include 1G EPON (supporting downstream and upstream speeds of 1 Gbps (gigabit per second)), 10G EPON (supporting downstream and upstream speeds of 10 Gbps), and 10G/1G EPON (supporting downstream speeds of 10 Gbps and upstream speeds of 1 Gbps). Other PON variations include Broadband PON (BPON), Gigabit PON (GPON), XGPON (also known as 10G-PON), and the like.

An EPON typically supports bidirectional communications between an Optical Line Terminal (OLT) and one or more Optical Network Units (ONUs). Downstream traffic is from the OLT to the ONUs, and upstream traffic is from the ONUs to the OLT. An ONU may, for example, be included in customer premises equipment (CPE), or installed at a customer or end-user site, such as a home or residence, a multiunit residential building, an office building or complex, or a business or workplace. A typical ONU converts optical signals (e.g., transmitted via fiber) to electrical signals, and vice versa.

In a typical configuration, an EPON hub includes one or more OLTs, each of which includes one or more EPON transceivers for optical signals. Each OLT includes one or more media access control (MAC) instances. The optical signals from each EPON transceiver are combined in a WDM combiner having one or more stages. A power splitter receives a single optical signal from the WDM combiner, and splits the signal to a plurality of optical fibers (each carrying many wavelengths). For example, a one-by-M (1×M) power splitter supports splitting the optical signal to M fibers. In another embodiment, the optical signals from each EPON transceiver bypass the WDM combiner and connected directly to the power splitter.

There is a need for an optical regeneration device that converts from the WDM/CWDM/DWDM domain to the EPON domain, resides in the node that connects the hub to the CPE, and provides a cost effective solution that is flexibly deployed. The advantages provided by the optical regeneration device of the present invention include enabling coexistence between PON signals and existing HFC services, increasing the optical link budget, increasing the geographic area that each OLT port can serve, increasing the number of subscribers who can be served by a single OLT port, and reducing the cost of the subscriber side optics. The presently disclosed invention satisfies these demands.

SUMMARY

Aspects of the present invention provide a multiplex conversion module, an EPON system with a multiplex conversion module, and systems and methods for EPON multiplex conversion. Aspects of the present invention also provide a passive optical network system having a node that is optically coupled to optical line terminals (OLTs), and that is optically coupled optical network units (ONUs). The node includes at least one fiber link module (FLM), each FLM including an upstream multiplex conversion device (MCD), and a downstream MCD. The upstream MCD receives an upstream optical signal from the ONUs, converts the upstream optical signal to an upstream electrical signal, and transmits a regenerated upstream optical signal to the OLTs. The downstream MCD receives a downstream optical signal from the OLTs, converts the downstream optical signal to a downstream electrical signal, and transmits a regenerated downstream optical signal to the ONUs.

DETAILED DESCRIPTION

The figures described below depict an EPON system, but the reader should understand that embodiments of the invention are applicable to any point-to-multipoint optical network topology, for example, BPON or GPON.

Figure 1:
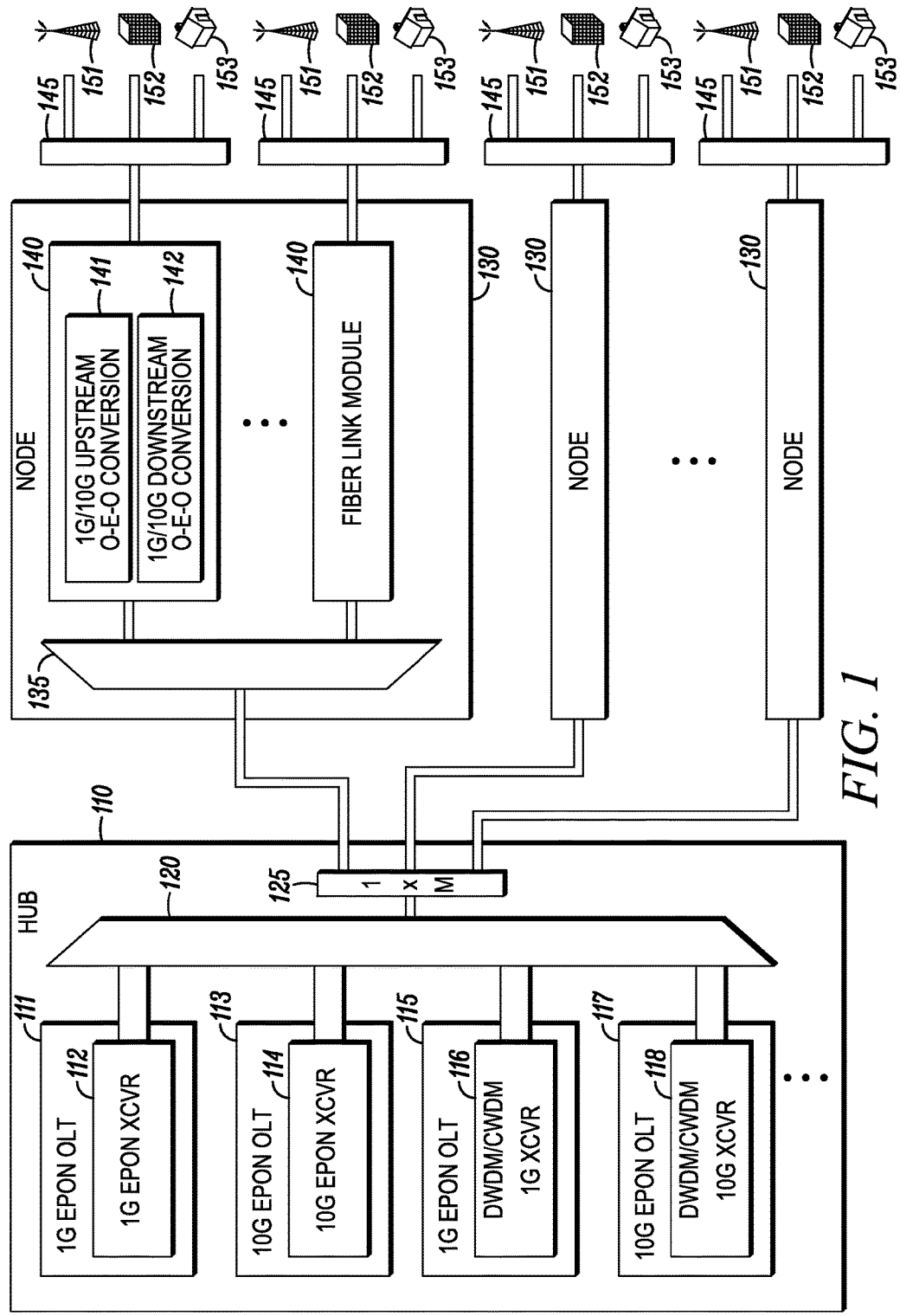
FIG. 1 is a block diagram that illustrates an exemplary EPON system in accordance with an embodiment of the present invention.

FIG. 1 is a block diagram that illustrates an exemplary EPON system in accordance with an embodiment of the present invention. The EPON system shown in FIG. 1 depicts a system level implementation that includes a hub 110 that connects to one or more nodes 130, where each node 130 connects to ONUs installed at one or more customer sites. For illustrative purposes, FIG. 1 depicts an exemplary ONU at a cellular tower 151 (e.g., to support backhaul), another exemplary ONU at a business or office building 152, and a third exemplary ONU at a home or residence 153. The connection from the node 130 to each ONU is a fiber connection.

The hub 110 shown in FIG. 1 depicts one or more PON OLTs that can be combined together with other HFC operator services onto a single network fiber from the hub 110 to each node 130. The single network fiber from the hub 110 to each node 130 may carry many wavelengths. FIG. 1 depicts the hub 110 including one or more OLTs that connect to a WDM combiner 120, where the combined side of the WDM combiner 120 connects to a 1×M power splitter 125. For illustrative purposes, FIG. 1 depicts an exemplary 1G EPON OLT 111 that includes a 1G EPON transceiver (XCVR) 112, an exemplary 10G EPON OLT 113 that includes a 10G EPON XCVR 114, an exemplary 1G EPON OLT 115 that includes a DWDM/CWDM 1G XCVR 116, and an exemplary 10G EPON OLT 117 that includes a DWDM/CWDM 10G XCVR 118. The 1G EPON OLT 111, 10G EPON OLT 113, 1G EPON OLT 115, and 10G EPON OLT 117 shown in FIG. 1 further include a MAC (not shown) instance.

The WDM combiner 120 may include one or more stages, for example, wide WDM, CWDM, or DWDM. In various embodiments, the WDM combiner 120 may include a WDM filter to support fiber conservation where the desire is to minimize the number of fibers used in a multiple service system; however, the present invention can operate without a WDM filter. In one embodiment, the 1×M power splitter 125 is a 1×M splitter where the desire is to use a single OLT port to support multiple nodes 130 in the field. In an alternative embodiment, the 1×M power splitter 125 is not present, and the invention supports the use of a 1×M splitter. The output of the splitter can then feed one or more of fiber nodes 130. Thus, a single OLT port can service multiple nodes 130. By connecting the nodes 130 in this manner, one or more instantiations of embodiments of the invention can operate independently, or together, to feed an access optical network. The subscriber (downstream) side of the node 130 can support any split and distance architecture that a standard PON architecture would support. The downstream side of the node can include, in some embodiments, a WDM filter, or WDM combiner 120, for recombining signals using EPON wavelengths.

The node 130 (e.g., a remote node in an HFC network) shown in FIG. 1 separates the hub-to-node link from the node-to-CPE link. The node 130 includes a WDM demultiplexer 135 that receives a fiber connection from the 1×M power splitter 125. The WDM demuliplexer 135 is paired with the WDM combiner 120, where the demultiplexed side of the WDM demultiplexer 135 connects to one or more segments, where each segment includes a fiber link module 140. In the embodiment shown in FIG. 1, each fiber link module 140 includes a 1 Gbps/10 Gbps upstream optical-to-electrical-to-optical (O-E-O) conversion 141, and a 1 Gbps/10 Gbps downstream O-E-O conversion 142. The downstream side of each fiber link module 140 connects to a 1×N power splitter 145, where each downstream side of the 1×N power splitter 145 is an optical fiber connection to an ONU installed at a customer site.

Advantageously, embodiments of the invention can allow fiber conservation between the hub 110 and the node 130, and can coexist with existing HFC services. Further embodiments of the invention can advantageously increase the split ratio that a single OLT port can support when operated at full distance. Further embodiments of the invention can advantageously provide a significant reduction in the cost of 10G PON optics. Further embodiments of the invention can advantageously allow a single OLT port to address a much wider geographic radius than conventional PON systems. Still further embodiments of the invention can be fully IEEE/EPON compliant on the CPE-side, and can use off-the-shelf ONUs. Additional embodiments of the invention can be fully ITU compliant in a G.983/G.984 version, allowing the use of off-the-shelf ONTs. Further embodiments can offer significantly less power consumption when compared to a remote OLT or Intelligent PON Node, and/or significantly better mean time between failures (MTBF) and reliability when compared with a remote OLT or Intelligent PON Node.

Figure 2:
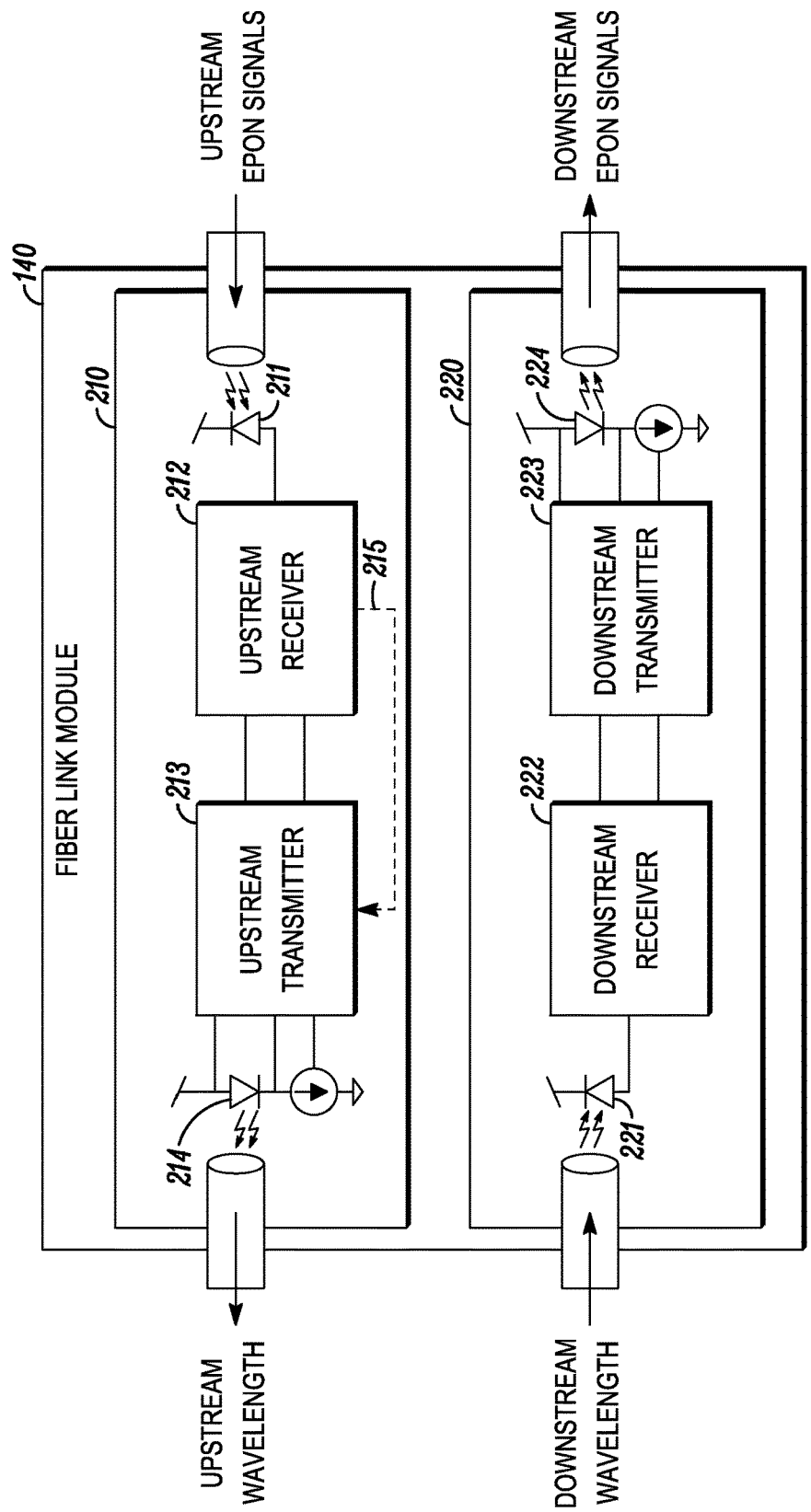
FIG. 2 is a block diagram that illustrates a fiber link module according to an embodiment of the present invention.

FIG. 2 is a block diagram that illustrates a fiber link module according to an embodiment of the present invention. The fiber link module 140 shown in FIG. 2 provides conversion between a WDM domain (e.g., wide WDM, CWDM, DWDM, and the like) and a PON domain (e.g., EPON, BPON, GPON, 10GEPON, XGPON, and the like). In an embodiment, a fiber link module 140 comprises an optical regeneration device, for O-E-O conversion. In an embodiment, the fiber link module 140 comprises an upstream multiplex conversion device (MCD) 210 as the upstream O-E-O conversion 141, and a downstream MCD 220 as the downstream O-E-O conversion 142. The upstream MCD 210 converts optical signals from a WDM domain to a PON domain, and the downstream MCD 220 converts optical signals from a PON domain to a WDM domain.

In addition, unlike a conventional 3R (reamplify, re-shape, re-time) reach extender, an embodiment of the fiber link module 140 does not need to include clock detection and recovery circuits, does not need to include a MAC function in the node, and does not require an ONU system on a chip (SOC).

The downstream MCD 220 shown in FIG. 2 includes a photodiode 221, downstream receiver 222, downstream transmitter 223, and laser 224. The photodiode 221 and the circuitry comprising the downstream receiver 222 function as an optical receiver that receives downstream signals from the OLTs. The photodiode 221 converts the optical power on a fiber optic cable into a proportionate electrical current that is the input to the downstream receiver 222. The output of the downstream receiver 222 is a digital logic voltage signal that is the input to the downstream transmitter 223. The laser 224 converts the output of the downstream transmitter 223 to optical power on a fiber optic cable. The circuitry comprising the downstream transmitter 223 and laser 224 function as an optical transmitter to transmit downstream signals to the ONUs.

In an exemplary embodiment, in the downstream path, the downstream MCD 220 comprises a simple O-E-O regeneration device with an optical receiver driving an optical transmitter. The optical receiver is designed to operate in standard continuous mode and receive the WDM/CWDM/DWDM signal from the OLT transmitter. The wavelength is selected based upon the constraints in a particular plant, in this example an HFC plant, and is based upon co-existence with existing services in that plant. The optical receiver simply converts the optical WDM/CWDM/DWDM non-return-to-zero (NRZ) signal into an electrical NRZ bit stream. This NRZ bit stream is then fed into a continuous mode optical transmitter that transmits at the appropriate wavelength for the data-rate and PON type. For example, in the case of a 1.25 Gbps EPON system, the nominal transmitter wavelength would be at 1490 nm. In the case of a 10 Gbps EPON system, the nominal transmitter wavelength would be at 1577 nm.

The upstream MCD 210 shown in FIG. 2 includes a photodiode 211, upstream receiver 212, upstream transmitter 213, and laser 214. The photodiode 211 and the circuitry comprising the upstream receiver 212 function as an optical receiver that receives upstream signals from the ONUs. The photodiode 211 converts the optical power on a fiber optic cable into a proportionate electrical current that is the input to the upstream receiver 212. The output of the upstream receiver 212 is a digital logic voltage signal that is the input to the upstream transmitter 213. The laser 214 converts the output of the upstream transmitter 213 to optical power on a fiber optic cable. The circuitry comprising the upstream transmitter 213 and laser 214 function as an optical transmitter to transmit upstream signals to the OLTs. In an alternative embodiment, the upstream MCD 210 includes an optional laser 214 enable/disable signal 215 from the upstream receiver 212 to the upstream transmitter 213. The optional laser 214 enable 215 may be generated using an optical signal detect on the upstream receiver 212 photodiode 211, or by using an RF signal detect function on the electrical data signal generated by the upstream receiver 212.

In the exemplary embodiment, in the upstream path, an upstream MCD 210 is provided. The upstream MCD 210 includes additional complexity that is not found in the downstream MCD 220. In the upstream MCD 210, a burst mode receiver 212 is used that does not require any kind of MAC information, such as a receiver described in U.S. Pat. Nos. 6,420,928 and 6,963,696, the disclosures of which are hereby fully incorporated by reference as if set forth herein. This burst mode receiver 212 is provided because the node 130 and the OLT will not always be co-located and because the PON MAC will be contained within the OLT. The burst mode receiver 212 is designed to receive at the appropriate wavelength for the data-rate and PON type that is being used. For example, in the case of a 1.25 Gbps EPON system, the nominal receiver wavelength would be at 1310 nm. In the case of a 10 Gbps EPON system, the nominal receiver wavelength would be at 1270 nm. The burst mode receiver 212 is designed to be stable over extended strings of logic "1's" and logic "0's", as well as inter-packet gaps and burst dead times. In the case of inter-packet gaps and burst dead times, the optical signal will return to the logic "0" state, in which case the receiver will resolve to a logic "0" state on the electrical side as well.

In the exemplary embodiment, the return transmitter 213 on the upstream side requires additional design consideration as well. The Automatic Power Control (APC) loop must be capable of handling the burst-mode nature of the upstream multi-point to point architecture. This means that the APC loop must be able to be activated during the burst, but then have its measuring and monitoring function frozen between bursts. Alternatively, a look-up table approach could also be used, as this would be immune to the challenges of operating in a burst-mode environment. In addition to the concerns around the APC loop operating in burst mode, the Laser bias current operation must also be addressed when operating in a point-to-multipoint configuration. Embodiments of the invention may be deployed under a number of different scenarios, consequently, a number of different bias current/power management options would need to be handled, dependent upon the deployment architecture. In some cases, no provisions would need to be made, with the exception of the APC loop control described above. In other cases, the bias power would need to be lowered, and consequently the Extinction Ratio (ER) at the transmitter would need to be increased in order to allow the design to operate in a system where multiple nodes are all serviced by a single OLT port. In other cases, where multipoint-to-point, many node to single hub architectures require the noise from adjacent upstream transmitters to be minimized, a signal will need to be provided between the burst mode receiver and the burst mode transmitter that logically enables and disables the transmitter portion of the design. This would allow the designer to reduce the competing transmitter noise to a level that is inconsequential and would enable the use of now industry standard burst mode transmitter architectures, such as those described in U.S. Pat. Nos. 6,738,401 and 7,031,357, the disclosures of which are hereby fully incorporated by reference as if set forth herein. The wavelength chosen for the upstream transmitter 213 located in the fiber link module 140 can be any WDM, CWDM, DWDM or other wavelength that is most compatible with the existing services running on the fiber, depending upon the exact deployment scenario.

The forward or downstream MCD 220 uses a continuous mode receiver 222 circuit with an appropriate WDM/CWDM/DWDM front end. This receiver 222 receives input from, or comprises, a photodiode 221 that converts the optical power on the fiber into a proportionate electrical current. The receiver circuit then converts the current into an NRZ digital logic voltage signal. This logical signal can be any number of digital logic families, including, but not limited to, LVPECL or CML. The receiver 222 can be, for example, PIN or APD based.

The downstream transmitter 223 functions using the appropriate wavelength for the data rate chosen. For example, in the case of a 1.25 Gbps EPON system, the nominal transmitter wavelength would be at 1490 nm. In the case of a 10 Gbps EPON system, the nominal transmitter wavelength would be at 1577 nm. It should also be noted that if the design is capable of 10 Gbps data rates, then it will also work at a 1.25 Gbps data rate. The laser 224 used in the downstream side, on the subscriber side, can be an FP, DFB or externally modulated laser 224. In the case of a 10 Gbps application, where solution cost is very sensitive and where the distance between each node and the end customers allows, a lower cost DFB laser could be used in place of much more expensive externally modulated laser, even when the distance from the hub 110 to the customer ONU is too great to allow for such an implementation. The laser bias current is shown external of the transmitter block, though this could also be included in the laser driver block.

In the upstream MCD 210, a burst mode receiver 212 is used that does not require any kind of MAC level information (i.e., a reset-less burst mode receiver) that can be chatter-free, such as the receiver described in U.S. Pat. Nos. 6,420,928 and 6,963,696. This is because the node and the OLT will not always be co-located and because the PON MAC will be contained within the OLT. The burst mode receiver 212 is designed to receive at the appropriate wavelength for the data-rate and PON type that is being used. For example, in the case of a 1.25 Gbps EPON system, the nominal receiver wavelength would be at 1310 nm. In the case of a 10 Gbps EPON system, the nominal receiver wavelength would be at 1270 nm. The burst mode receiver is designed to be stable over extended strings of logic "1's" and logic "0's", as well as inter-packet gaps and burst dead times. In the case of inter-packet gaps and burst dead times, the optical signal will return to the logic "0" state, in which case the receiver will resolve to a logic "0" state on the electrical side as well. The burst mode receiver 212 may employ either a PIN or APD based receiver, depending upon the cost/network architecture trade-offs.

In an embodiment, the upstream transmitter 213 (return transmitter on the upstream side) requires additional design consideration as well. The return transmitter 213 includes an Automatic Power Control loop (APC) that must be capable of handling the burst-mode nature of the upstream multi-point-to-point architecture. This means that the APC loop must be able to be activated during the burst, but then have its measuring and monitoring function frozen between bursts. Alternatively, a look-up table approach could also be used, as this would be immune to the challenges of operating in a burst-mode environment. In addition to the concerns around the APC loop operating in burst mode, the Laser bias current operation must also be addressed when operating in a point to multipoint configuration. Embodiments of the invention may be deployed under a number of different scenarios, consequently, a number of different bias current/power management options would need to be handled, dependent upon the deployment architecture. In some cases, such as a point-to-point network between the node and the hub, no provisions would need to be made, with the exception of the APC loop control described above. In other cases, the bias power would need to be lowered, and consequently the Extinction Ratio (ER) at the transmitter would need to be increased in order to allow the design to operate in a system where multiple nodes are all serviced by a single OLT port. In other cases, where multi-point-to-point, many node to single hub architectures require the noise from adjacent upstream transmitters to be minimized, a signal will need to be provided between the burst mode receiver and the burst mode transmitter that logically enables and disables the transmitter portion of the design. This would allow the designer to reduce the competing transmitter noise to a level that is inconsequential and would enable the use of now industry standard burst mode transmitter architectures, such as those described in U.S. Pat. Nos. 6,738,401 and 7,031,357. The wavelength chosen for the upstream transmitter located in the node can be any WDM, CWDM, DWDM or other wavelength that is most compatible with the existing services running on the fiber, depending upon the exact deployment scenario. The control connection between the burst mode receiver and the burst mode transmitter is also illustrated for cases when this signal is required.

Figure 3:
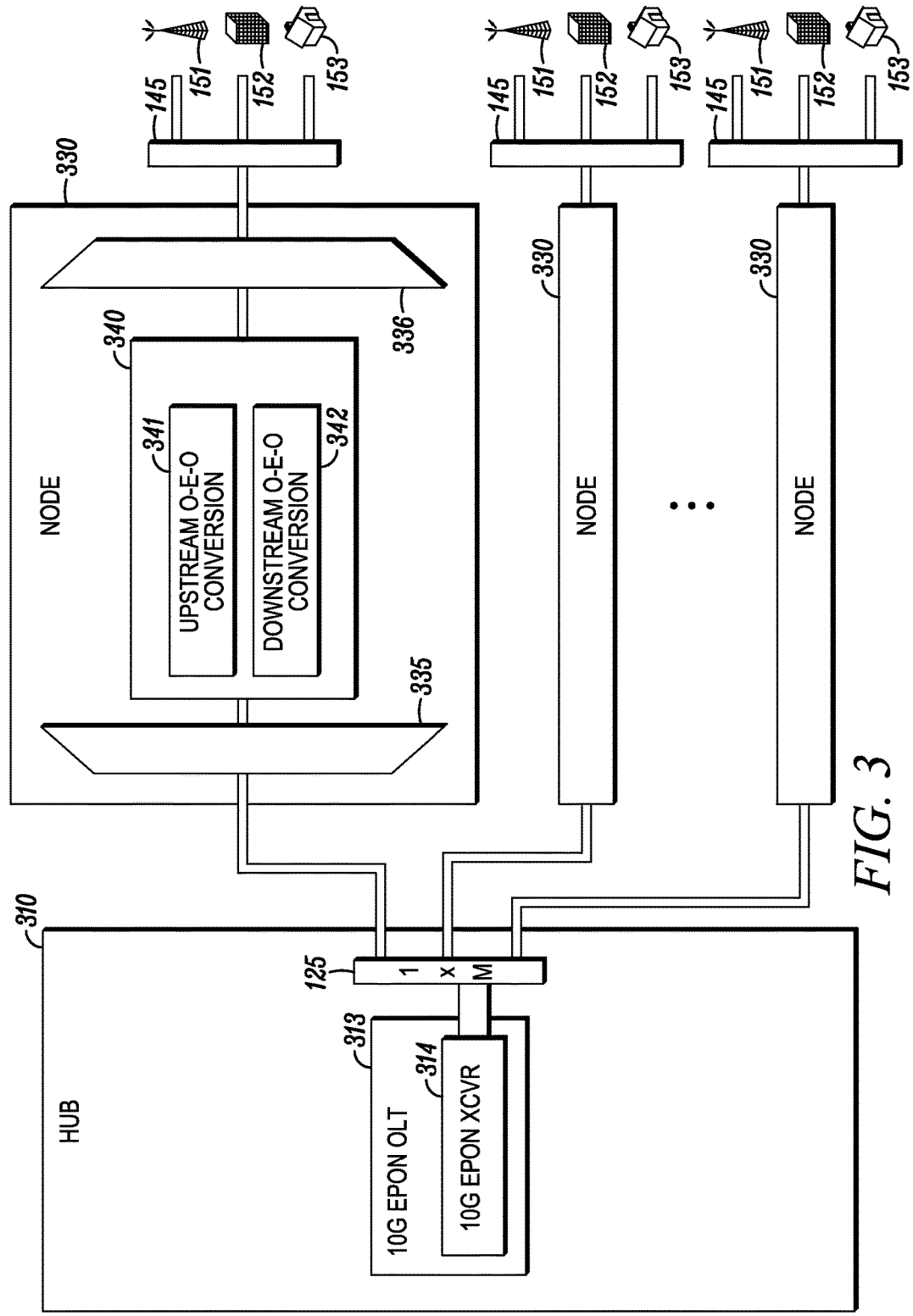
FIG. 3 is a block diagram that illustrates an exemplary 10G EPON OLT system in accordance with an embodiment of the present invention.

FIG. 3 is a block diagram that illustrates an exemplary 10G EPON OLT system in accordance with an embodiment of the present invention. The system architecture shown in FIG. 3 is an embodiment of the system architecture shown in FIG. 1. The hub 310 shown in FIG. 3 includes a single OLT, a 10G EPON OLT 313 that includes a 10G EPON XCVR 314, that connects to a 1×M power splitter 125. The output of the 1×M power splitter 125 feeds one or more fiber nodes 330. The node 330 includes a WDM demultiplexer 335 that receives a fiber connection from the 1×M power splitter 125. The demultiplexed side of the WDM demultiplexer 335 connects to one or more segments, where each segment includes a fiber link module 340 that includes an upstream O-E-O conversion 341 and a downstream O-E-O conversion 342. The downstream side of each fiber link module 340 connects to a combiner 336, that connects to a 1×N power splitter 145, where each downstream side of the 1×N power splitter 145 is an optical fiber connection to an ONU installed at a customer site.

Figure 4:
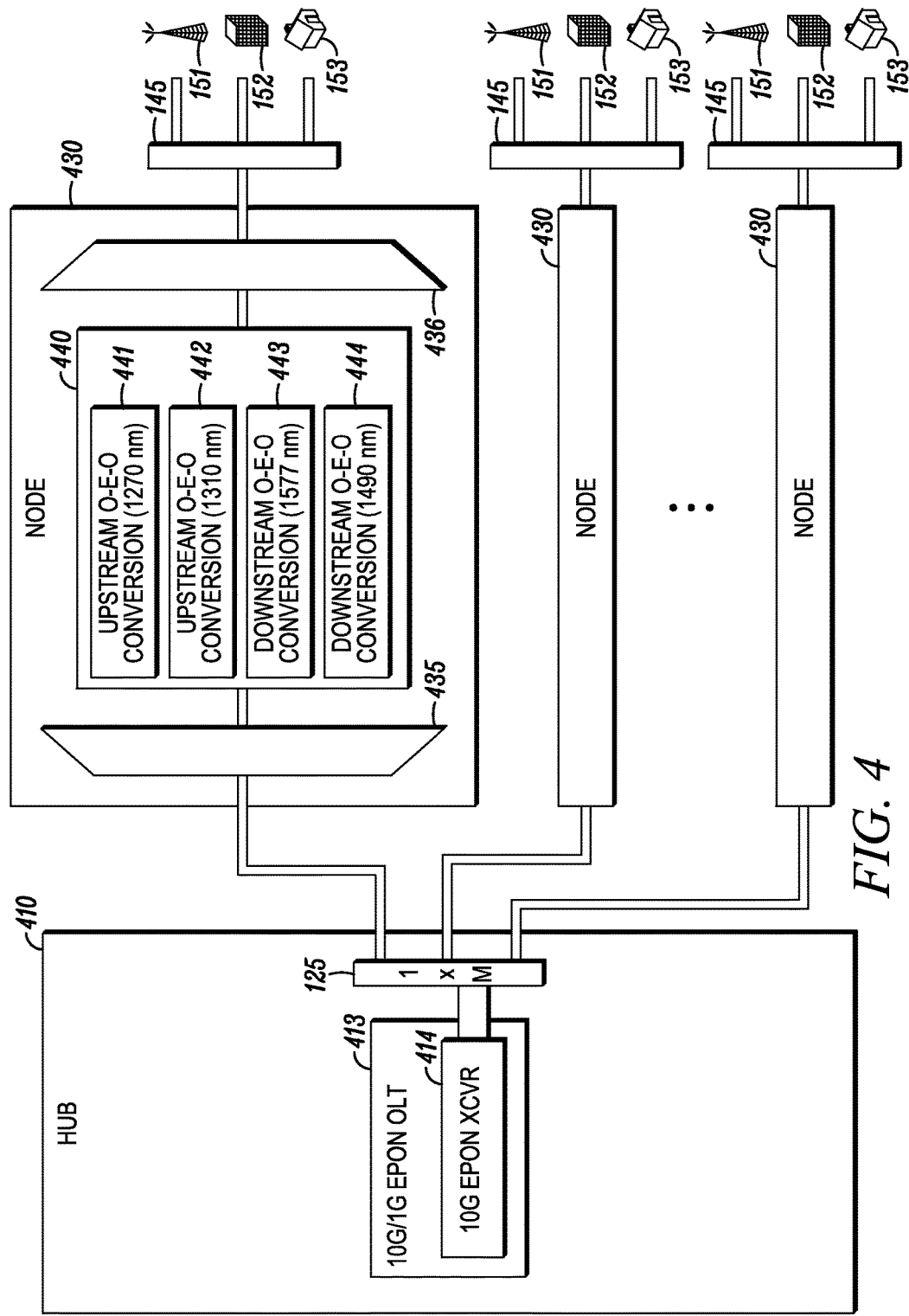
FIG. 4 is a block diagram that illustrates an exemplary 10G EPON OLT system in accordance with an embodiment of the present invention.

FIG. 4 is a block diagram that illustrates an exemplary 10G EPON OLT system in accordance with an embodiment of the present invention. The system architecture shown in FIG. 4 is an embodiment of the system architecture shown in FIG. 1. The hub 410 shown in FIG. 4 includes a single OLT, a 10G EPON OLT 413 that includes a 10G EPON XCVR 414, that connects to a 1×M power splitter 125. The output of the 1×M power splitter 125 feeds one or more fiber nodes 430. The node 430 includes a WDM demultiplexer 435 that receives a fiber connection from the 1×M power splitter 125. The demultiplexed side of the WDM demultiplexer 435 connects to one or more segments, where each segment includes a fiber link module 440 that includes a 10 Gbps upstream O-E-O conversion 441 at the 1270 nm wavelength, a 1.25 Gbps upstream O-E-O conversion 442 at the 1310 nm wavelength, a 10 Gbps downstream O-E-O conversion 443 at the 1577 nm wavelength, and a 1.25 Gbps downstream O-E-O conversion 444 at the 1490 nm wavelength. As shown in FIG. 4, the four paths in the fiber link module 440 run in parallel. The downstream side of each fiber link module 440 connects to a combiner 436, that connects to a 1×N power splitter 145, where each downstream side of the 1xN power splitter 145 is an optical fiber connection to an ONU installed at a customer site. In an alternative embodiment, in an application where it is desired to operate the 10 Gbps EPON and 1.25 Gbps EPON upstream links 441, 442 in TDMA mode, the 1.25 Gbps upstream O-E-O conversion 442 at the 1310 nm wavelength may be eliminated, and the 10 Gbps upstream O-E-O conversion 441 at the 1270 nm wavelength may use a broadband detector that is capable of receiving both 1310 nm and 1270 nm signals. In this alternative embodiment, the upstream O-E-O conversion 442 will run at both 10 Gbps and 1.25 Gbps, but a reduction in dynamic range and link budget may be observed.

Figure 5:
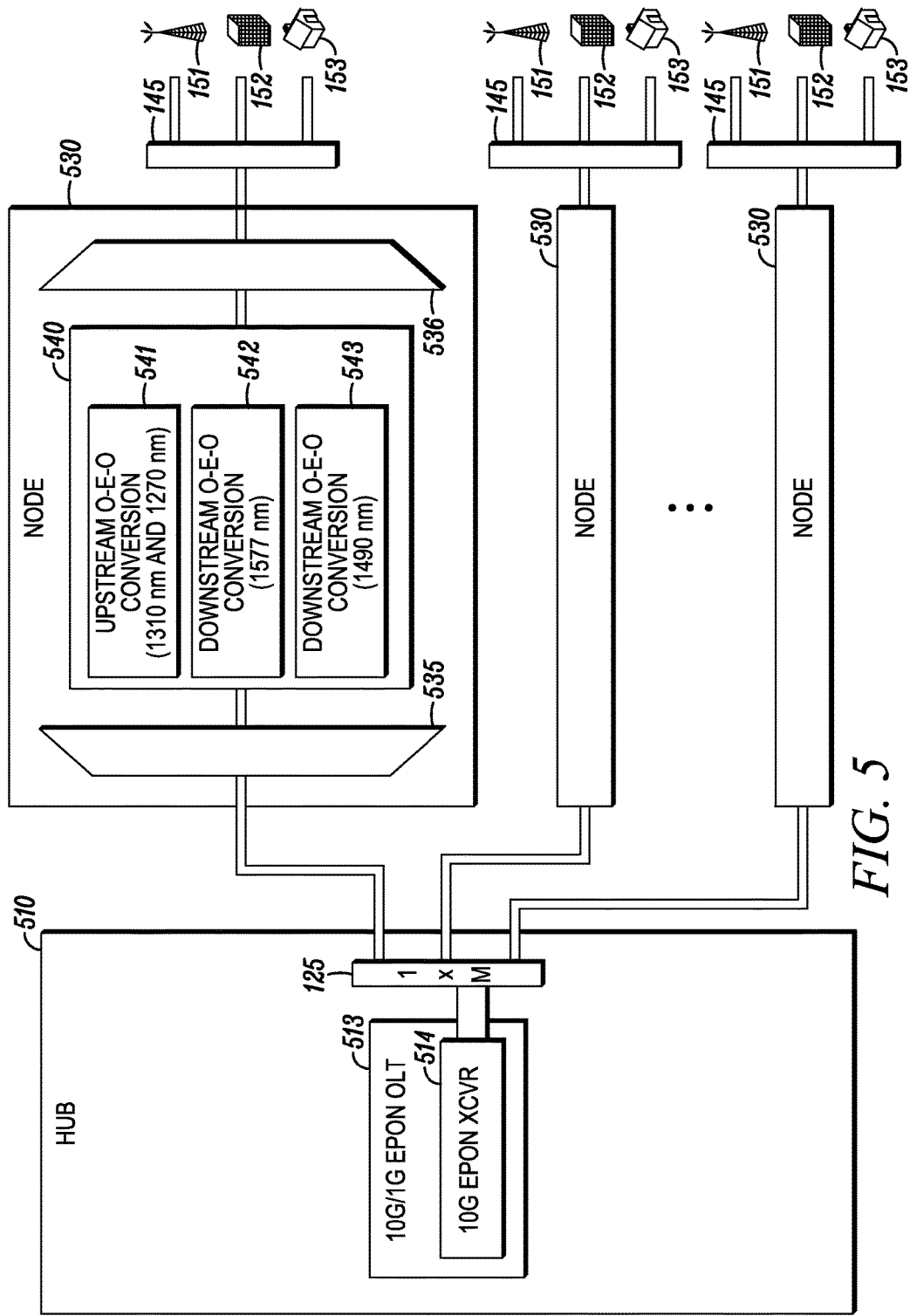
FIG. 5 is a block diagram that illustrates an exemplary 10G/1G EPON OLT system in accordance with an embodiment of the present invention.

FIG. 5 is a block diagram that illustrates an exemplary 10G/1G EPON OLT system in accordance with an embodiment of the present invention. The system architecture shown in FIG. 5 is an embodiment of the system architecture shown in FIG. 1. The hub 510 shown in FIG. 5 includes a single OLT, a 10G/1G EPON OLT 513 that includes a 10G EPON XCVR 514, that connects to a 1×M power splitter 125. The output of the 1×M power splitter 125 feeds one or more fiber nodes 530. The node 530 includes a WDM demultiplexer 535 that receives a fiber connection from the 1×M power splitter 125. The demultiplexed side of the WDM demultiplexer 535 connects to one or more segments, where each segment includes a fiber link module 540 that includes a 1.25 Gbps/10 Gbps upstream O-E-O conversion 541 at the 1310 nm and 1270 nm wavelengths, a 10 Gbps downstream O-E-O conversion 542 at the 1577 nm wavelength, and a 1.25 Gbps downstream O-E-O conversion 543 at the 1490 nm wavelength. As shown in FIG. 5, the three paths in the fiber link module 540 are optimized for cost and power consumption within the node, rather than for link budget on the access network side of the node. The downstream side of each fiber link module 540 connects to a combiner 536, that connects to a 1×N power splitter 145, where each downstream side of the 1xN power splitter 145 is an optical fiber connection to an ONU installed at a customer site.

Figure 6:
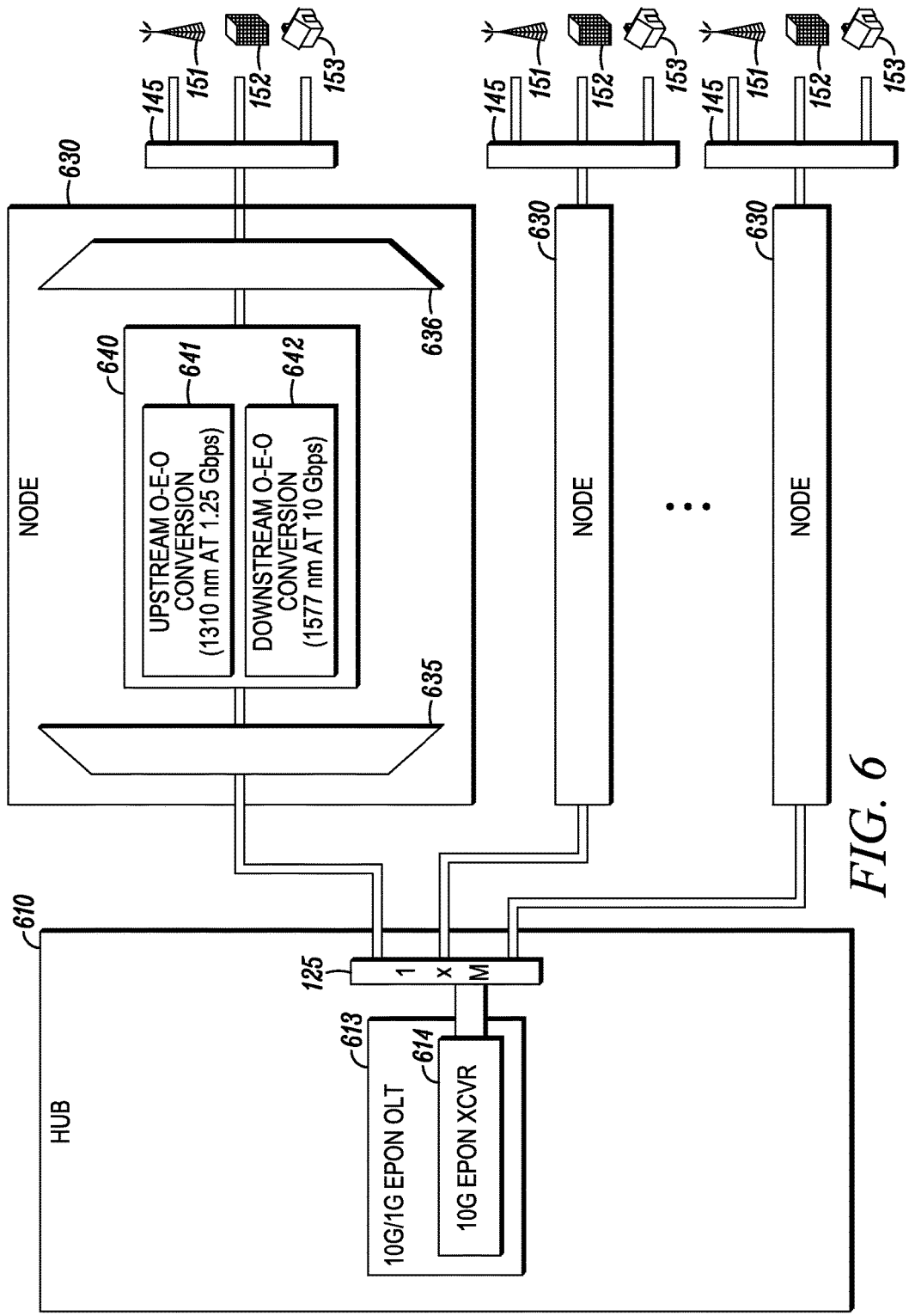
FIG. 6 is a block diagram that illustrates an exemplary 10G/1G EPON OLT system in accordance with an embodiment of the present invention.

FIG. 6 is a block diagram that illustrates an exemplary 10G/1G EPON OLT system in accordance with an embodiment of the present invention. The system architecture shown in FIG. 6 is an embodiment of the system architecture shown in FIG. 1. The hub 610 shown in FIG. 6 includes a single OLT, a 10G/1G EPON OLT 613 that includes a 10G EPON XCVR 614, that connects to a 1×M power splitter 125. The output of the 1×M power splitter 125 feeds one or more fiber nodes 630. The node 630 includes a WDM demultiplexer 635 that receives a fiber connection from the 1×M power splitter 125. The demultiplexed side of the WDM demultiplexer 635 connects to one or more segments, where each segment includes a fiber link module 640 that includes a 1.25 Gbps upstream O-E-O conversion 641 at the 1310 nm wavelength, and a 10 Gbps downstream O-E-O conversion 642 at the 1577 nm wavelength. As shown in FIG. 6, the two paths in the fiber link module 640 are an asymmetric implementation that uses a 10 Gbps downstream link in conjunction with a 1.25 Gbps upstream link. The downstream side of each fiber link module 640 connects to a combiner 636, that connects to a 1×N power splitter 145, where each downstream side of the 1×N power splitter 145 is an optical fiber connection to an ONU installed at a customer site.

Figure 7:
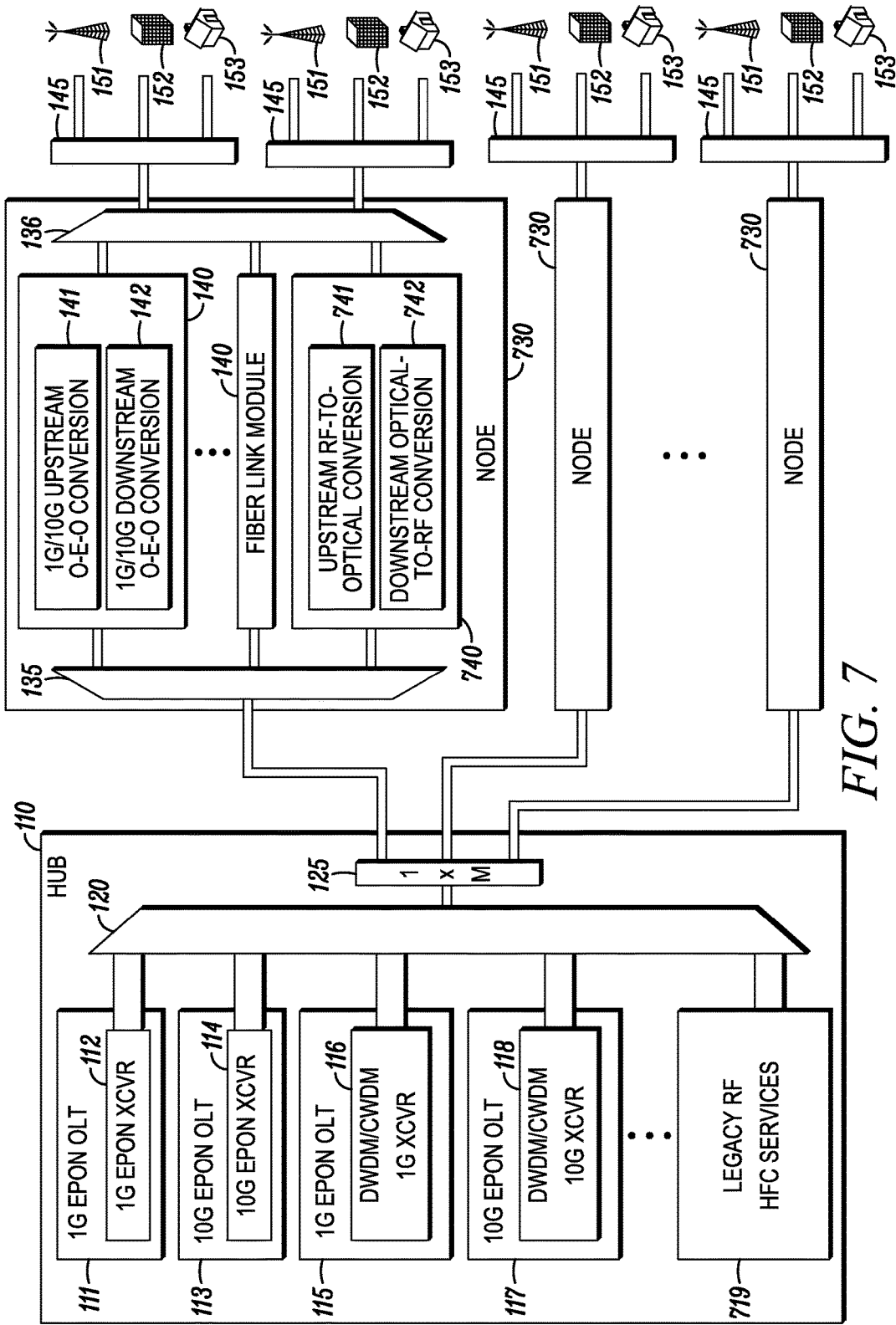
FIG. 7 is a block diagram that illustrates an exemplary 10G/1G EPON OLT system in accordance with an embodiment of the present invention.

FIG. 7 is a block diagram that illustrates an exemplary 10G/1G EPON OLT system in accordance with an embodiment of the present invention. The system architecture shown in FIG. 7 is an embodiment of the system architecture shown in FIG. 1. As shown in FIG. 7, the hub 110 includes legacy radio frequency (RF) HFC services 719 that connect to the WDM combiner 120. The output of the 1×M power splitter 125 in the hub 110 shown in FIG. 7 feeds one or more fiber nodes 730. The node 730 includes a WDM demultiplexer 135 that receives a fiber connection from the 1×M power splitter 125. The demultiplexed side of the WDM demultiplexer 135 connects to one or more segments, where each segment includes a fiber link module 140 similar to that shown in FIG. 1. In addition, the node 730 includes a link module 740 that provides upstream RF-to-optical conversion 741, and downstream optical-to-RF conversion 742, to support the legacy RF HFC services 719. The fiber link modules 140 co-exist with the link module 740 because the WDM/CWDM/DWDM link between the node 730 and the hub 110 allow these services to operate independently of each other and with the legacy RF HFC services 719.

Figure 8:
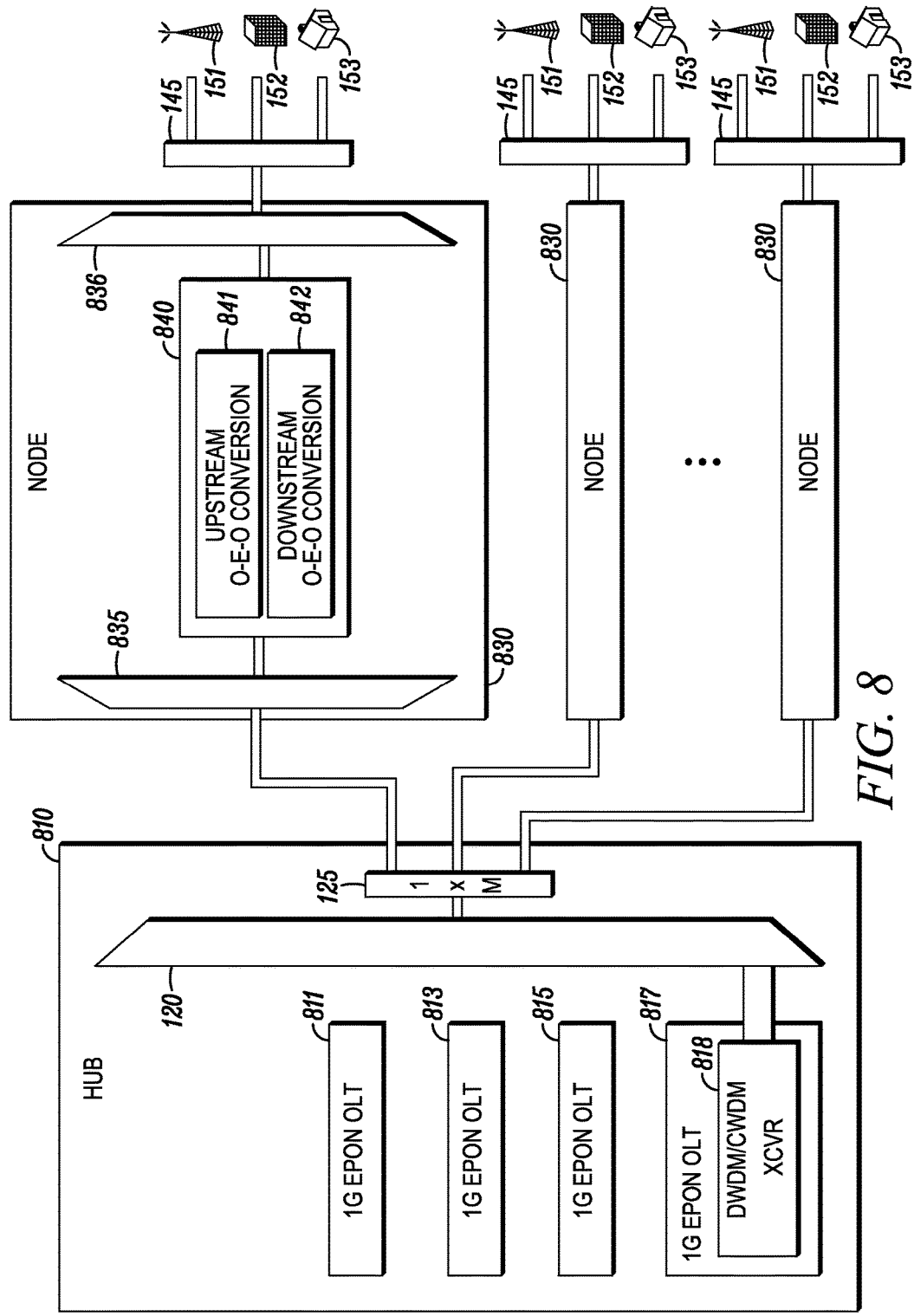
FIG. 8 is a block diagram that illustrates an exemplary 1G EPON OLT system in accordance with an embodiment of the present invention.

FIG. 8 is a block diagram that illustrates an exemplary 1G EPON OLT system in accordance with an embodiment of the present invention. The system architecture shown in FIG. 8 is an embodiment of the system architecture shown in FIG. 1. The hub 810 shown in FIG. 8 includes one or more 1G EPON OLTs, where one 1G EPON OLT 817 that includes a DWDM/CWDM XCVR 818 connects to a WDM combiner 120, where the combined side of the WDM combiner 120 connects to a 1×M power splitter 125. The output of the 1×M power splitter 125 feeds one or more fiber nodes 830. The node 830 includes a WDM demultiplexer 835 that receives a fiber connection from the 1×M power splitter 125. The demultiplexed side of the WDM demultiplexer 835 connects to one or more segments, where each segment includes a fiber link module 840 that includes an upstream O-E-O conversion 841, and a downstream O-E-O conversion 842. As shown in FIG. 8, a single OLT port services multiple fiber nodes and a variety of services, for example, residential applications, business customers or Cell Tower Backhaul (CTBH) traffic. The downstream side of each fiber link module 840 connects to a combiner 836, that connects to a 1×N power splitter 145, where each downstream side of the 1×N power splitter 145 is an optical fiber connection to an ONU installed at a customer site.

Figure 9:
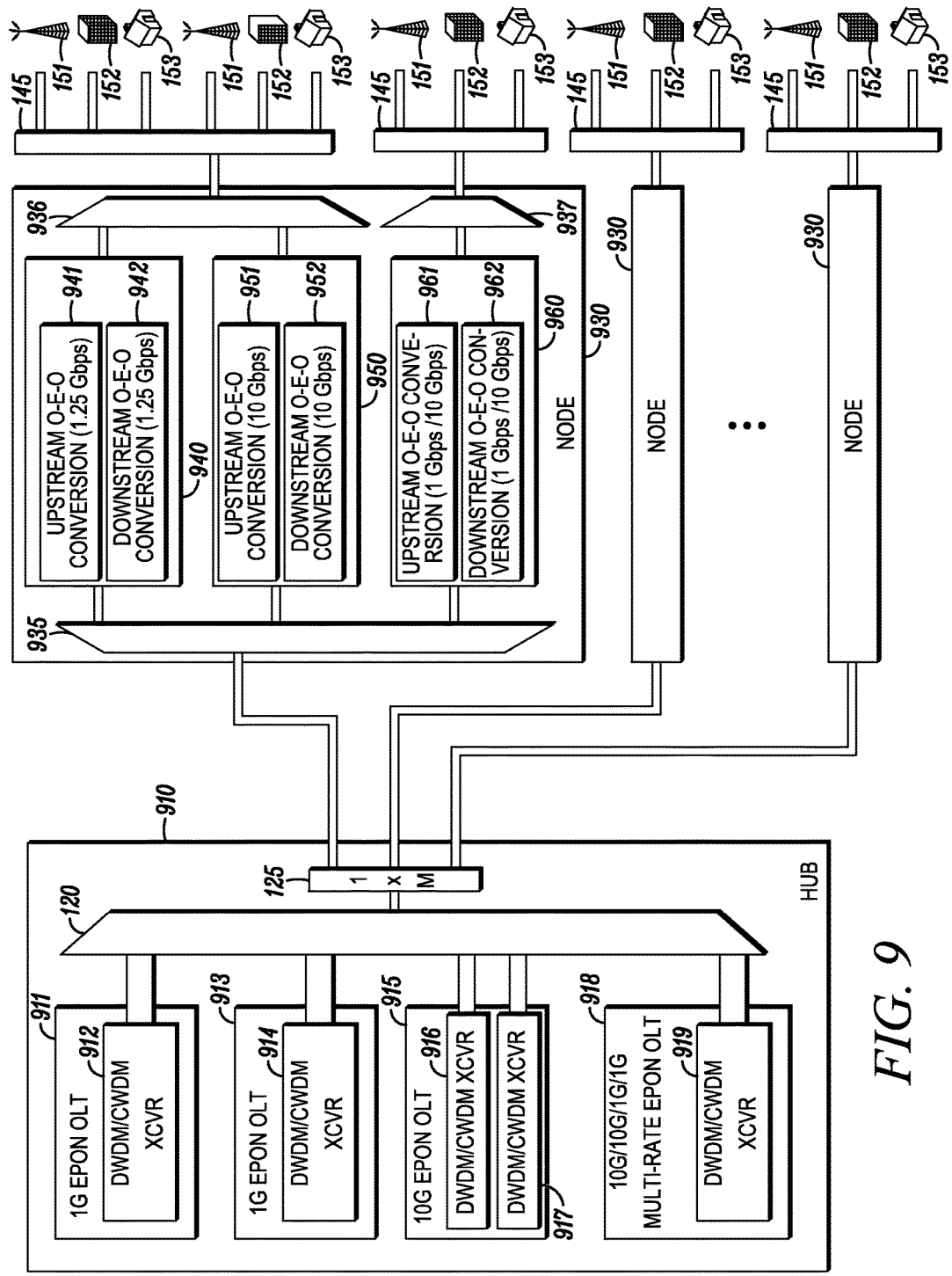
FIG. 9 is a block diagram that illustrates an exemplary 10G/1G EPON OLT system in accordance with an embodiment of the present invention.

FIG. 9 is a block diagram that illustrates an exemplary 10G/1G EPON OLT system in accordance with an embodiment of the present invention. The system architecture shown in FIG. 9 is an embodiment of the system architecture shown in FIG. 1. FIG. 9 depicts a hub 910 that includes four OLTs that connect to a WDM combiner 120, where the combined side of the WDM combiner 120 connects to a 1×M power splitter 125. For illustrative purposes, FIG. 9 depicts an exemplary 1G EPON OLT 911 that includes a DWDM/CWDM XCVR 912, another exemplary 1G EPON OLT 913 that includes a DWDM/CWDM XCVR 914, an exemplary 10G EPON OLT 915 that includes two DWDM/CWDM XCVRs 916, 917, and an exemplary 10G/10G/1G/1G Multi-Rate EPON OLT 918 that includes a DWDM/CWDM XCVR 919. The output of the 1×M power splitter 125 in the hub 910 shown in FIG. 7 feeds one or more fiber nodes 930. The node 930 includes a WDM demultiplexer 935 that receives a fiber connection from the 1×M power splitter 125. The demultiplexed side of the WDM demultiplexer 935 connects to one or more segments, where each segment includes a fiber link module 140. The first fiber link module 940 shown in FIG. 9 includes a 1.25 Gbps upstream O-E-O conversion 941, and a 1.25 Gbps downstream O-E-O conversion 942. The second fiber link module 950 shown in FIG. 9 includes a 10 Gbps upstream O-E-O conversion 951, and a 10 Gbps downstream O-E-O conversion 952. The third fiber link module 960 shown in FIG. 9 includes a 1 Gbps/10 Gbps upstream O-E-O conversion 961, and a 1 Gbps/10 Gbps downstream O-E-O conversion 962. A combiner 936 receives the output from the first fiber link module 940 and the second fiber link module 950. Another combiner 937 receives the output from the third fiber link module 960. The three fiber link modules 940, 950, 960 shown in FIG. 9 run in parallel to provide 1 Gbps to some of the ONUs and 10 Gbps to other ONUs. The system implementation shown in FIG. 9 provides multi-rate PON service delivered over a single access network. The implementation inside of the node 930 can consist of multiple independent conversion modules, or a single condensed conversion module. Architecturally these approaches are the same as each path is independent. Combination and splitting occurs in the WDM filters on either side of the module, either in a single stage or cascade of stages. Additional, independent modules, can also be populated in the same node.

Figure 10:
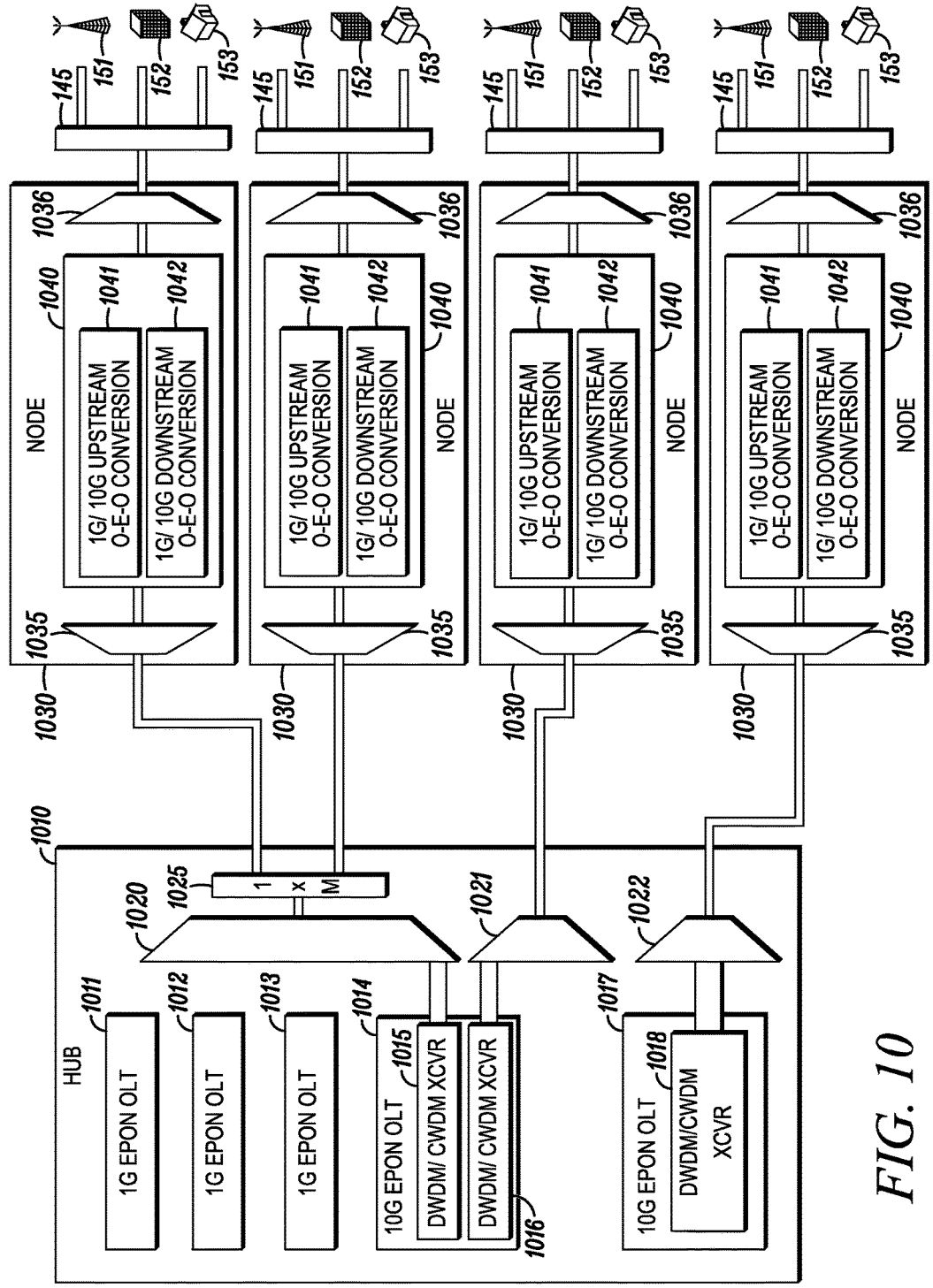
FIG. 10 is a block diagram that illustrates an exemplary 10G/1G EPON OLT system in accordance with an embodiment of the present invention.

FIG. 10 is a block diagram that illustrates an exemplary 10G/1G EPON OLT system in accordance with an embodiment of the present invention. The system architecture shown in FIG. 10 is an embodiment of the system architecture shown in FIG. 1. FIG. 10 depicts a hub 1010 that includes five OLTs that connect to a WDM combiner 120, where the combined side of the WDM combiner 120 connects to a 1×M power splitter 125. For illustrative purposes, FIG. 10 depicts three exemplary 1G EPON OLTs 1011, 1012, 1013, an exemplary 10G EPON OLT 1014 that includes two DWDM/CWDM XCVRs 1015, 1016, and an exemplary 10G EPON OLT 1017 that includes a DWDM/CWDM XCVR 1018. The output of the 1×M power splitter 125 in the hub 1010 shown in FIG. 10 feeds one or more fiber nodes 1030. The node 1030 includes a WDM demultiplexer 1035 that receives a fiber connection from the 1×M power splitter 125. The demultiplexed side of the WDM demultiplexer 1035 connects to one or more segments, where each segment includes a fiber link module 1040 that includes a 1G/10G upstream O-E-O conversion 1041, and a 1G/10G downstream O-E-O conversion 1042. The downstream side of each fiber link module 1040 connects to a combiner 1036, that connects to a 1×N power splitter 145, where each downstream side of the 1×N power splitter 145 is an optical fiber connection to an ONU installed at a customer site. FIG. 10 illustrates an architecture that allows for future flexibility, according to further embodiments. In the case of deployment scenarios where service "take rates" may be low and it is desirable to maximize the geographic area that can be supported per OLT port, many nodes can be supported by a single OLT port and consequently, the service radius of each node can be added together. If, in the future, the service usage at a given node or set of nodes increases to the point where it is desired to move one or a group of nodes to a single OLT port, this can be accomplished by re-routing the fiber to a free OLT port or an additional optical splitter/combiner 1021, 1022 that feeds a free OLT port. In these scenarios, service would only be temporarily affected for the users on the nodes that are being moved, the remaining nodes would continue to operate unaffected. As shown in the diagram, a WDM filter combiner would only be required if additional services are required to be multiplexed or if fiber conservation is important to the implementer.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

We claim:

1. A node having a fiber link module (FLM) in a passive optical network, the node optically coupled to at least one optical line terminal (OLT) and at least one optical network unit (ONU), the node operable to communicate with multiple OLTs via a single fiber to serve multiple ONUs, the node comprising:
    a demultiplexer for receiving an optical WDM signal carrying many wavelengths, the optical WDM signal including at least one wavelength output from a single OLT port that is also communicable to one or more additional nodes;
    multiple optical-electrical-optical (OEO) regeneration devices operating in parallel for conversion of optical signals, each OEO regeneration device operable to convert a downstream optical signal demultiplexed from the optical WDM signal to a different wavelength that targets a respective ONU;
    an upstream multiplex conversion device (MCD) that receives an upstream optical signal from said at least one ONU, converts the upstream optical signal to an upstream electrical signal via at least one of said multiple OEO regeneration devices operable for conversion in an upstream path, and without use of clock detection and recovery on the upstream electrical signal, transmits a regenerated upstream optical signal, wave division multiplexed with at least one additional upstream optical signal regenerated by a second one of said multiple OEO regeneration device in the node, to said at least one OLT,
        wherein the upstream MCD includes a burst-mode receiver without media access control (MAC) information to receive the upstream optical signal, and further wherein the burst-mode receiver is an AC-coupled pre-amplifier; and
    a downstream MCD comprising at least one of said optical-electrical-optical (OEO) regeneration devices for conversion in the downstream path, the downstream MCD having a continuous mode receiver circuit for receiving one of the signals demultiplexed from the optical WDM signal and operably driving one or more optical transmitters serving multiple ONUs,
    wherein the downstream MCD:
        receives, by the continuous mode receiver circuit, a downstream optical signal that is demultiplexed from the optical WDM signal received from said at least one OLT at a first downstream wavelength, wherein the continuous mode receiver circuit is configured to convert the optical power in the demultiplexed optical signal to an electrical current that is proportionate to said optical power, and generates a downstream electrical signal from said electrical current, the downstream electrical signal comprising an electrical non-return-to-zero (NRZ) digital logic voltage bit stream, and
        regenerates a downstream optical signal at a second downstream wavelength by converting the downstream electrical signal to optical power without use of clock detection and recovery on the downstream electrical signal, and
        drives the optical transmitter using said optical power to transmit downstream to said at least one ONU.

2. The FLM of claim 1, wherein a wavelength of the upstream optical signal differs from a wavelength of the regenerated upstream optical signal.

3. The FLM of claim 1, wherein a wavelength of the downstream optical signal differs from a wavelength of the regenerated downstream optical signal.

4. The FLM of claim 1, wherein a photodiode converts the upstream optical signal to the upstream electrical signal, and wherein a laser converts the upstream electrical signal to the regenerated upstream optical signal.

5. The FLM of claim 4, wherein the upstream MCD includes an enable/disable signal for the laser.

6. The FLM of claim 1, wherein a photodiode converts the downstream optical signal to the downstream electrical signal, and wherein a laser converts the downstream electrical signal to the regenerated downstream optical signal.

7. The FLM of claim 1, wherein the upstream MCD includes a transmitter to transmit the regenerated upstream optical signal, wherein the transmitter includes an automatic power control (APC) loop to accommodate the burst-mode receiver.

8. A fiber link module (FLM) in a passive optical network that includes at least one optical line terminal (OLT) and at least one optical network unit (ONU), the FLM comprising:
    a link to multiple optical-electrical-optical (OEO) regeneration devices operating in parallel for conversion of optical signals, each OEO regeneration device operable to convert a downstream optical signal demultiplexed from an optical WDM signal to a different wavelength that targets a respective ONU;
    an upstream multiplex conversion device (MCD), comprising:
    an upstream optical receiver that receives an upstream optical signal from said at least one ONU; and
    an upstream optical transmitter that transmits, without use of clock detection and recovery on the upstream electrical signal, a regenerated upstream optical signal to said at least one OLT,
    wherein the upstream optical receiver is a burst-mode receiver without media access control (MAC) information to receive the upstream optical signal, and further wherein the burst-mode receiver comprises an AC-coupled pre-amplifier, electrically coupled to the upstream optical transmitter;

a downstream MCD comprising at least one of said optical-electrical-optical (OEO) regeneration devices for conversion in the downstream path, the downstream MCD having a continuous mode receiver circuit for receiving one of the signals demultiplexed from the optical WDM signal and operably driving one or more optical transmitters serving multiple ONUs, the downstream MCD comprising:

a downstream optical receiver comprising the continuous mode receiver circuit that receives, by the continuous mode receiver circuit, a downstream optical signal that is demultiplexed from the optical WDM signal received from said at least one OLT at a first downstream wavelength, wherein the continuous mode receiver circuit is configured to convert the optical power in the demultiplexed optical signal to an electrical current that is proportionate to said optical power, and generates a downstream electrical signal from said electrical current, the downstream electrical signal comprising an electrical non-return-to-zero (NRZ) digital logic voltage bit stream, and wherein the at least one of said optical-electrical-optical (OEO) regeneration devices for conversion in the downstream path regenerates a downstream optical signal at a second downstream wavelength by converting the downstream electrical signal to optical power;

the downstream optical transmitter driven by the optical power to transmit downstream to said at least one ONU.

9. The FLM of claim 8, wherein a wavelength of the upstream optical signal differs from a wavelength of the regenerated upstream optical signal.

10. The FLM of claim 8, wherein a wavelength of the downstream optical signal differs from a wavelength of the regenerated downstream optical signal.

11. The FLM of claim 8, wherein the upstream optical receiver includes a photodiode to convert the upstream optical signal to the upstream electrical signal, and wherein the upstream optical transmitter includes a laser to convert the upstream electrical signal to the regenerated upstream optical signal.

12. The FLM of claim 11, wherein the upstream MCD includes an enable/disable signal for the laser.

13. The FLM of claim 8, wherein the downstream optical receiver includes a photodiode to convert the downstream optical signal to the downstream electrical signal, and wherein the downstream optical transmitter includes a laser to convert the downstream electrical signal to the regenerated downstream optical signal.

14. The FLM of claim 8, wherein the upstream optical transmitter includes an automatic power control (APC) loop to accommodate the burst-mode receiver.

15. A passive optical network system, comprising:

a node that is optically coupled to at least one optical line terminal (OLT), and that is optically coupled to at least one optical network unit (ONU), the node operable to communicate with multiple OLTs via a single fiber to serve multiple ONUs;

a demultiplexer in the node for receiving an optical WDM signal carrying many wavelengths, the optical WDM signal including at least one wavelength output from a single OLT port that is also communicable to one or more additional nodes;

multiple optical-electrical-optical (OEO) regeneration devices in the node operating in parallel for conversion of optical signals, each OEO regeneration device operable to convert a downstream optical signal demultiplexed from the optical WDM signal to a different wavelength that targets a respective ONU;

at least one fiber link module (FLM) in the node, each FLM comprising:

an upstream multiplex conversion device (MCD) that receives an upstream optical signal from said at least one ONU, converts the upstream optical signal to an upstream electrical signal via at least one of said multiple OEO regeneration devices operable for conversion in an upstream path, and without use of clock detection and recovery on the upstream electrical signal, transmits a regenerated upstream optical signal to said at least one OLT, wherein the upstream MCD includes a burst-mode receiver without media access control (MAC) information to receive the upstream optical signal, and further wherein the burst-mode receiver is an AC-coupled pre-amplifier;

a downstream MCD comprising at least one of said optical-electrical-optical (OEO) regeneration devices for conversion in the downstream path, the downstream MCD having a continuous mode receiver circuit for receiving one of the signals demultiplexed from the optical WDM signal and operably driving one or more optical transmitters serving multiple ONUs, wherein the downstream MCD:

receives, by the continuous mode receiver circuit, a downstream optical signal that is demultiplexed from the optical WDM signal received from said at least one OLT at a first downstream wavelength, wherein the continuous mode receiver circuit is configured to convert the optical power in the demultiplexed optical signal to an electrical current that is proportionate to said optical power, and generates a downstream electrical signal from said electrical current, the downstream electrical signal comprising an electrical non-return-to-zero (NRZ) digital logic voltage bit stream, and regenerates a downstream optical signal at a second downstream wavelength by converting the downstream electrical signal to optical power without use of clock detection and recovery on the downstream electrical signal, and drives the optical transmitter using said optical power to transmit downstream to said at least one ONU.

16. The passive optical network system of claim 15, wherein a wavelength of the upstream optical signal differs from a wavelength of the regenerated upstream optical signal.

17. The passive optical network system of claim 15, wherein a wavelength of the downstream optical signal differs from a wavelength of the regenerated downstream optical signal.

18. The passive optical network system of claim 15, wherein a photodiode converts the upstream optical signal to the upstream electrical signal, and wherein a laser converts the upstream electrical signal to the regenerated upstream optical signal.

19. The passive optical network system of claim 18, wherein the upstream MCD includes an enable/disable signal for the laser.

20. The passive optical network system of claim 15, wherein a photodiode converts the downstream optical signal to the downstream electrical signal, and wherein a laser converts the downstream electrical signal to the regenerated downstream optical signal.

21. The passive optical network system of claim 15, wherein the upstream MCD includes a transmitter to transmit the regenerated upstream optical signal, wherein the transmitter includes an automatic power control (APC) loop to accommodate the burst-mode receiver.

\* \* \* \* \*